UNITED STATES PATENT OFFICE.

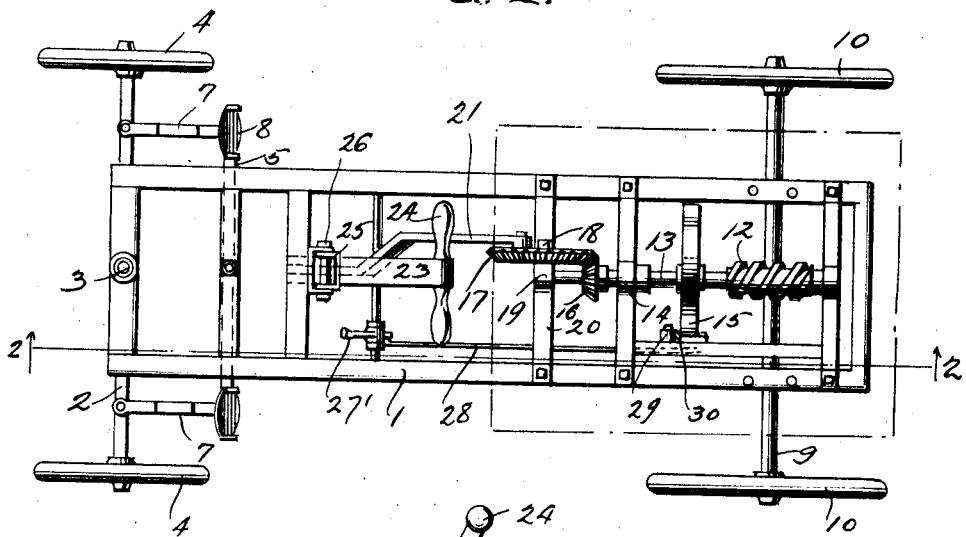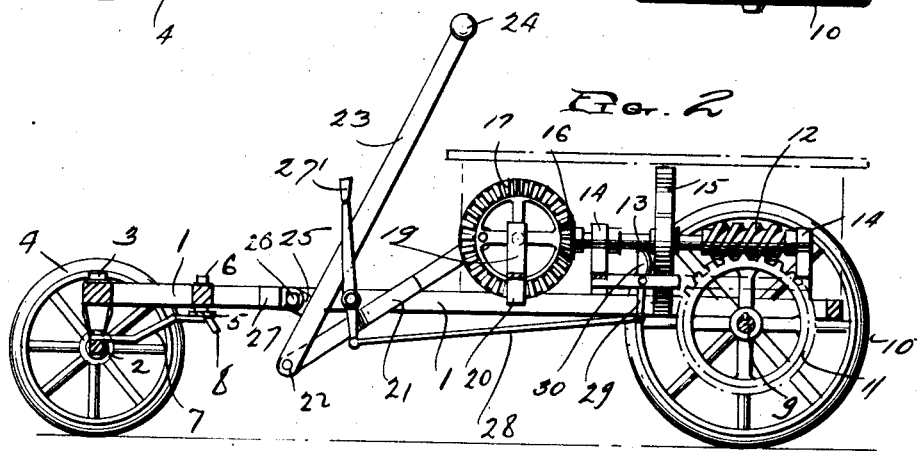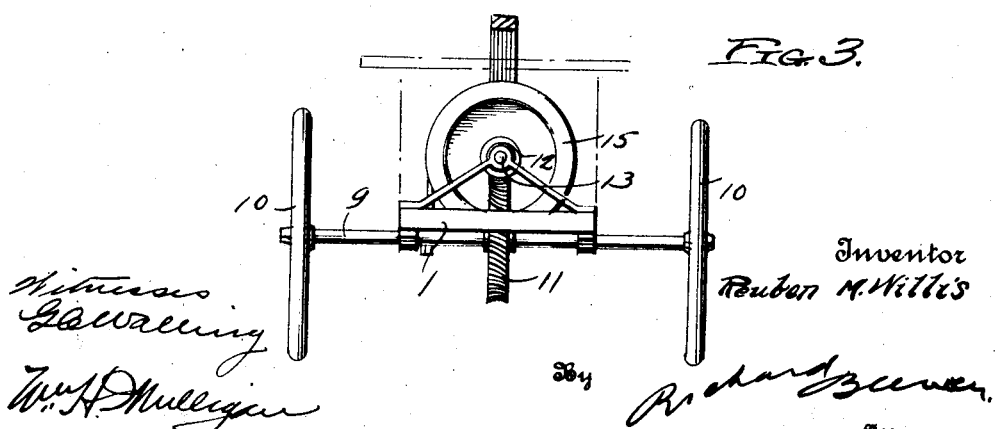

REUBEN McNEIL WILLIS, OF CHANUTE, KANSAS, ASSIGNOR OF ONE-THIRD TO GORDON J. WILLIS AND ONE-THIRD TO ANTHONY E. WILLIS, BOTH OF CHANUTE, KANSAS.

SELF-PROPELLED VEHICLE.

1,344,108.   Specification of Letters Patent.   Patented June 22, 1920.

Application filed July 29, 1919. Serial No. 314,048.

*To all whom it may concern:*

Be it known that I, REUBEN M. WILLIS, a citizen of the United States, residing at Chanute, in the county of Neosho and State of Kansas, have invented certain new and useful Improvements in Self-Propelled Vehicles, of which the following is a specification.

This invention relates to self propelled vehicles and more particularly to a hand car particularly adapted for use by children.

The primary object of the invention is to provide a vehicle upon which mechanism may be mounted which may be connected to the rear axle and wheels of the vehicle and which are adapted to be manually actuated by the manipulation of a conveniently located lever so that power may be imparted to the rear wheels for driving the vehicle.

A further object of this invention is the provision of a device of this character which consists of comparatively few parts and is simple in construction, but durable and well adapted to withstand the rough usage to which devices of this character are ordinarily subjected.

For a full description of the invention and the advantages and merits thereof reference is to be had to the following description and accompanying drawings, in which:—

Figure 1 is a plan view of the device constructed in accordance with my invention, Fig. 2 is a section taken on the line 2—2 of Fig. 1.

Fig. 3 is a rear end elevation.

Referring to the drawings, wherein is illustrated the preferred form of my invention, in which like numerals of reference indicate like or corresponding parts throughout the several views, the frame is supported at its front end upon the front axle 2 which is provided with a king pin 3 whereby the front axle may be turned and the latter is equipped with the front wheels 4. Attached to the frame near the front thereof is a bar 5 which is adapted to turn on a centrally located pivot 6, the ends of the bar being connected by the arms 7 to the front axle 2. At this point, the ends of the bar 5 are also equipped with foot pedals 8 which may receive the feet of the rider so that the bar 5 may be turned on its pivot to turn the front axle whereby the vehicle may be guided.

The rear of the vehicle is supported by the axle 9 having the rear wheels 10 and equipped intermediate its ends with a worm gear 11 which is in mesh with a worm 12 mounted on a longitudinally extending drive shaft 13 which is supported in centrally located bearings 14 attached to the side bars of the frame 1. The shaft 13 is equipped with a fly wheel 15 and with a beveled pinion 16 which is in mesh with a beveled gear 17 which is rotatably mounted on a stud 18 supported by a centrally located standard 19, the latter being mounted upon a cross bar 20 fixed to the frame 1. A pitman 21 is connected to the gear 17 and has its opposite end pivotally connected by means of the pivot pin 22 to an operating lever 23 which is equipped with a handle bar 24 disposed within convenient reach of the operator of the vehicle who may be seated upon a conveniently located seat or platform indicated by broken lines in Figs. 1 and 2. Obviously the platform may be arranged in any preferred manner upon the frame of the vehicle. The handle or actuating lever 23 is provided with a lug 25 which is connected as indicated at 26 to a cross bar 27 mounted in the frame, whereby the actuating lever 23 may be swung backwardly and forwardly by the operator of the vehicle so that reciprocatory movement may be imparted to the pitman 21 for turning the beveled gear 27. This turning movement of the beveled gear 17 turns the pinion 16 thus imparting movement to the shaft 13, which, by virtue of its engagement with the worm gear 11 through the medium of the worm 12, will turn the rear axle whereby movement is imparted to the rear wheels to drive the vehicle forwardly.

A brake lever 27' is pivotally mounted upon the frame and is equipped with a brake rod 28 which is joined to one end of a pivotal brake 29 having a brake shoe 30 adapted to engage the fly wheel 15 whereby the momentum of the fly wheel will be stopped by engagement of the brake therewith when the handle 27' is actuated.

The arrangement of the gearing as above set forth is especially adapted for juveniles since it will permit a maximum power to be imparted to the wheels with a minimum exertion and considerable speed may be developed by a back and forth movement of the handle bar 24. Coasting may also be had with the present vehicle, the speed of the same being governed by the brake device which will engage the fly wheel.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. A self propelled vehicle of the class described comprising a frame having a front axle provided with wheels, and a rear axle having wheels fixed thereto, a worm gear, a drive shaft equipped with a worm in mesh with said worm gear and carrying a pinion and a fly wheel, a driving gear rotatably mounted and engageable with said pinion, means to impart rotary movement of said drive gear, and a brake mechanism engageable with said fly wheel for retarding the motion of said vehicle.

2. A vehicle of the character described comprising a wheel supported frame having its rear axle equipped with a worm gear, a drive shaft having a worm engageable with said worm gear, said drive shaft being equipped with a beveled pinion, a stud shaft disposed transversely with respect to said drive shaft and carrying a beveled gear in mesh with said beveled pinion, an actuating lever pivotally mounted and connected to said frame, a pitman joined to said actuating lever and having a connection with said beveled gear, whereby the latter will be rotated when said pitman is reciprocated by the action of the said actuating lever.

3. A self propelled vehicle of the class described comprising a frame having a front axle provided with wheels, and a rear axle having wheels fixed thereto, a worm gear, a drive shaft equipped with a gear in mesh with said worm gear, and carrying a pinion and a fly wheel, a driving gear rotatably mounted and engageable with said pinion, means to impart rotary movement of said drive gear.

4. A vehicle of the character described comprising a wheel supported frame having its rear axle equipped with a worm gear, a drive shaft having a worm engageable with said worm gear, said drive shaft being equipped with a beveled pinion, and a fly wheel, a stud shaft disposed transversely with respect to said drive shaft and carrying a beveled gear in mesh with said beveled pinion, a cross bar mounted in said frame, an actuating lever pivotally mounted and connected to said cross bar, a pitman joined to said actuating lever and having a connection with said beveled gear, whereby the latter will be rotated when said pitman is reciprocated by the action of said actuating lever.

In testimony whereof I affix my signature in presence of two witnesses.

REUBEN McNEIL WILLIS.

Witnesses:
 Geo. K. Bideau,
 M. E. Cunningham.